United States Patent Office 3,057,858
Patented Oct. 9, 1962

3,057,858
6α-SUBSTITUTED-16β-METHYL-11-
EPIHYDROCORTISONE
Carl Djerassi, Palo Alto, Calif., assignor to Syntex S.A.,
Mexico, D.F., Mexico, a corporation of Mexico
No Drawing. Filed Aug. 13, 1959, Ser. No. 833,390
Claims priority, application Mexico Oct. 3, 1958
25 Claims. (Cl. 260—239.55)

This invention relates to a new method of preparing certain cyclopentano phenanthrene derivatives.

More particularly, it relates to a new method for preparing 6α,16β-substituted derivatives of 11-epi-hydrocortisone having the general formula:

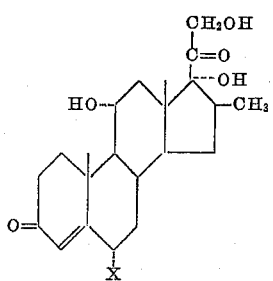

wherein the substituent in 16β-position is the methyl group and the substituent in 6α-position (X in the above formula) is either the methyl group or fluorine. Such compounds are valuable intermediates for the preparation of the 6α-fluoro-16β-methyl and the 6α,16β-dimethyl derivatives of cortical hormones and have been claimed in patent application Serial No. 792,962, filed February 2, 1959, and Serial No. 796,766, filed March 3, 1959, respectively.

While the methods described in these two patent applications for the preparation of the aforesaid 6α,16β-substituted 11-epi-hydrocortisone derivatives start from commercially available diosgenin and therefore require a microbiological process step for introducing the hydroxyl group in 11α-position, it is the object of the present invention to provide a method for the preparation of the aforesaid 11-epi-hydrocortisone derivatives which is free from this requirement so that these derivatives can be produced exclusively by chemical reactions from a different commercially available starting material which already contains an oxygen at C–11 in ring C.

One of the few sapogenins satisfying this condition is botogenin which can be isolated from native Mexican plants, and is therefore, the preferred starting material in the method according to the invention. Botogenin is 12-keto-diosgenin and can be transformed into 11α-hydroxy-diosgenin. Methods for preparing this latter important starting material have been described in Patents No. 2,776,969, issued on January 8, 1957, and 2,840,555, issued on June 24, 1958.

The method of this present invention has been schematically represented in the reaction diagram given hereinafter, in which R and R' represent hydrogen and/or an acyl group derived from a hydrocarbon carboxylic acid of up to 12 carbon atoms in particularly acetyl (Ac), and X represents either methyl or fluorine.

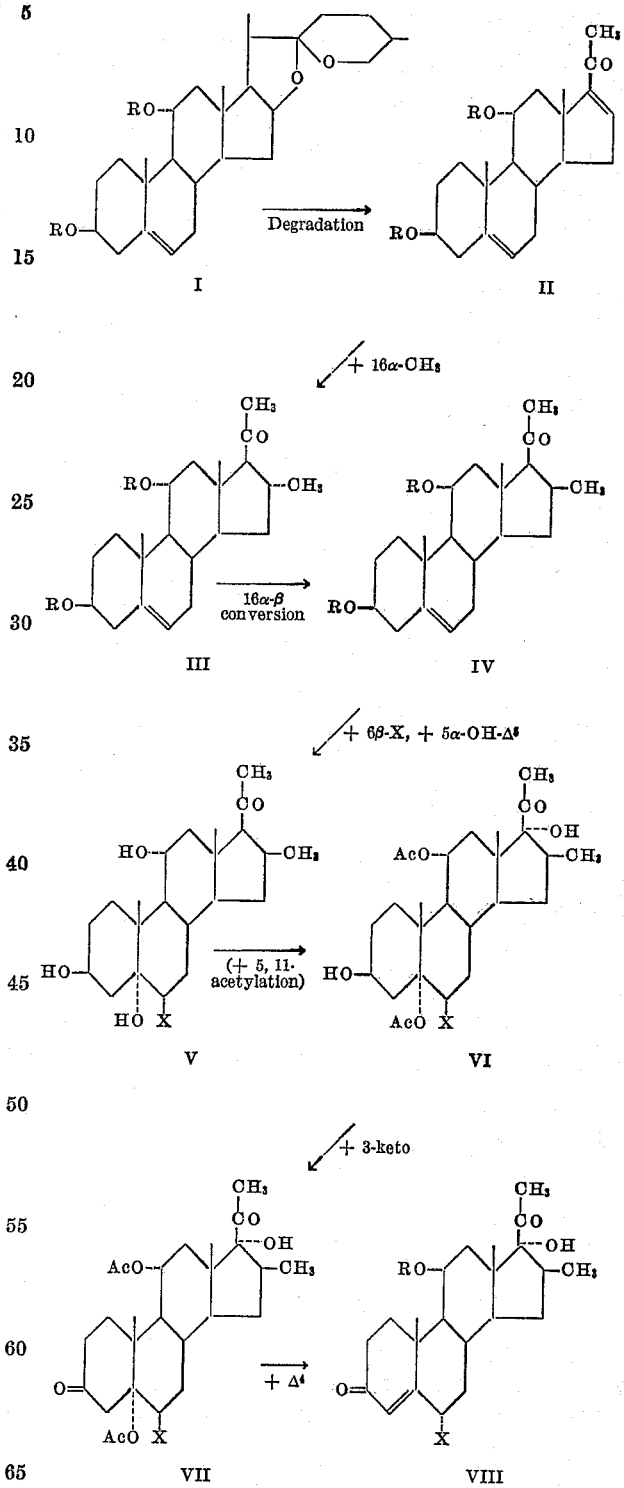

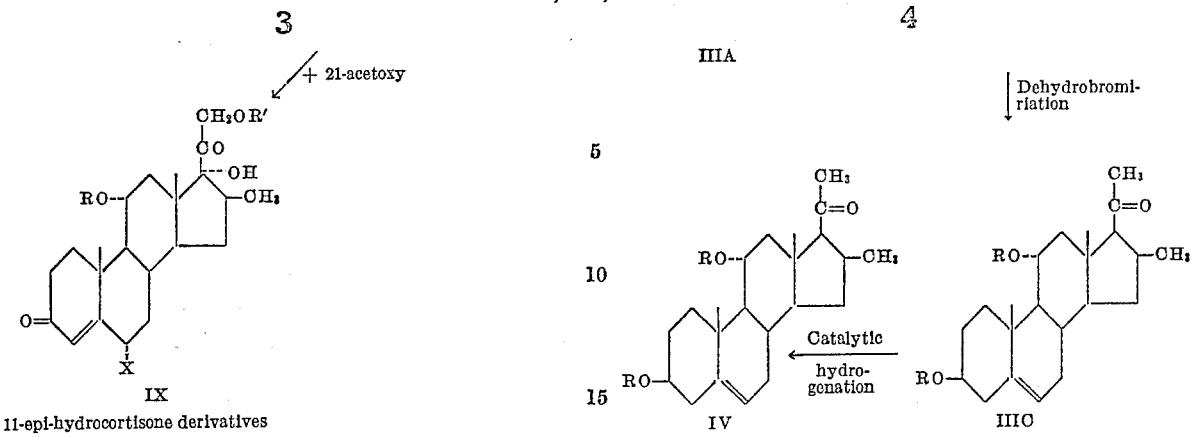

IX 11-epi-hydrocortisone derivatives

When starting from 11α-hydroxy-diosgenin (I), the spiroketal side chain of this sapogenin is first degraded by adding to, for instance, the diacetate (R in I=acetyl) acetic anhydride and heating the resulting mixture under exclusion of access of air, for instance in a sealed tube, to a temperature of about 190° C., oxidizing the resulting reaction product at low temperature with chromic acid in aqueous acetic acid, and then refluxing the reaction mixture with sodium hydroxide in water-acetone.

The resulting reaction product (II) is a mixture of $\Delta^{5,16}$-pregnadiene-3β,11α-diol-20-one in the free form and this compound acetylated at C-3 and/or at C-11. This mixture can be further treated with acetic anhydride in pyridine solution to produce the uniform diacetate product.

The latter, or another corresponding diester, is then treated with a methyl magnesium halide, preferably with methyl magnesium bromide in benzene, ether or tetrahydrofurane, or in a mixture of such solvents, and, under simultaneous hydrolysis of the acetoxy groups, there is obtained 16α-methyl-$\Delta^5$-pregnene-3β-11α-diol - 20 - one (III).

The latter compound may be acetylated by reaction with acetic anhydride in pyridine solution. As the next stage in the method according to the invention, the steric configuration at the C-16 position of intermediate (III) is inverted by a sequence of steps which obviates the use of diazomethane. This latter reagent has been generally employed in the methods reported for the preparation of 16β-methyl compounds. Since diazomethane is not suitable for use on an industrial scale, avoiding the use of diazomethane in the preparation of the 16β-intermediate (IV) is a considerable practical advantage offered by the method of our invention.

This inversion stage involves a number of steps represented in the following reaction diagram.

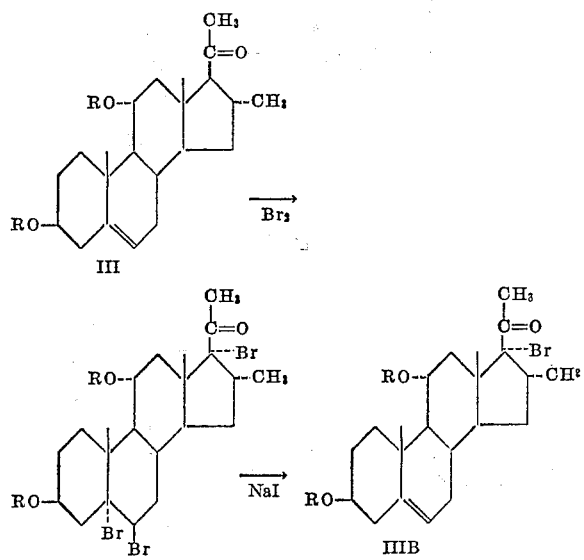

and thus comprises the steps of contacting the intermediate III with two molar equivalents of bromine in a solvent inert to the ensuring bromination reaction, such as dioxane, so as to obtain 16α-methyl-5α,6β-17-tribromine-pregnane-3β,11α-diol-20-one (IIIA); refluxing the latter with sodium iodide in acetone solution to produce 16α - methyl-17-bromo-$\Delta^5$-pregnene-3β,11α-diol-20-one, (III); refluxing IIIB with collidine or reacting IIIB with calcium carbonate in mixture with dimethylformamide and thereby dehydrobrominating IIIB to 16-methyl-$\Delta^{5,16}$-pregnadiene-3β,11α-diol-20-one, (IIIC); and then selectively saturating the double bond at C-16 in IIIC by hydrogenation in the presence of a Raney nickel or palladium on barium sulfate catalyst, which hydrogenation step yield the desired sterically inverted 16β-methyl-$\Delta^5$-pregnene-3β,11α-diol-20-one (IV), or a diester, for instance the diacetate of the latter compound, if intermediate III was the corresponding diester of the 16α-isomer. The acyl group R in the diester should preferably not exceed 12 carbon atoms.

Moreover, the ester groups of the diester of intermediate IV can in turn be hydrolyzed by a conventional alkaline treatment and the 3β,11α-diol of the 16β-isomer be obtained.

The next following stage of transforming intermediate IV, either in the form of the diol or its diester, to the desired 6α,16β-substituted 11-epi-hydrocortisone involves essentially the step of introducing either a fluorine atom or a methyl group at C-6β, (as in V); introducing the 17α-hydroxyl group (step VI) as well as an acetoxyl group at C-21 followed by the introduction of the $\Delta^4$ and the 3-keto grouping, or as shown in the reaction diagram, first the introduction of the 3-keto grouping (intermediate VII), of the double bond at C-4 (intermediate VIII), and ultimately the introduction of the acetoxyl group at C-21 (IX). There is thus obtained either 6α,16β-dimethyl-11-epi-hydrocortisone, if X in product IX is a methyl group, or 16β-methyl-6α-fluoro-11-epi-hydrocortisone, if X is fluorine, or the 21-acetate of either compound, if R' in Formula IX is acetyl.

More particularly, if it is the methyl group which is to be introduced at C-6, the stage of transforming intermediate IV into the final products IX of the method according to the invention is carried out in practice by first temporarily protecting the keto group at C-20 of the intermediate IV by formation of a 20-cycloalkylene ketal, preferably by refluxing with ethylene glycol in the presence of p-toluenesulfonic acid under anhydrous conditions and in mixture with benzene, as illustrated in the next following reaction diagram. By reaction with a peracid, for example with permonophthalic acid in mixture with ether-chloroform, the $\Delta^5$ double bond is epoxidized so that 16β - methyl-20-ethylenedioxy-5α,6α-oxido-pregnane-3β,11α-diol or its diester is obtained; by refluxing the epoxide with a methyl magnesium halide, preferably a solution of the former in benzene with methyl magnesium bromide solution in ether, there is produced 6β,16β-dimethyl-20-ethylenedioxy-pregnane-3β,5α,11α-triol, the ketal group of which is then hydrolyzed by acid treatment, for example by reaction with small amounts of p-toluenesulfonic acid in aqueous acetone solution. This treatment yields 6β, 16β - dimethyl-pregnane-3β,5α,11α-triol-20-one (intermediate V in which X is methyl).

A fluorine atom, on the other hand, is introduced in C-6 position by direct epoxidation of the starting compounds to form 16β-methyl-5α,6α-oxido-pregnane-3β, 11α-diol-20-one (or its diester IVC), followed by reaction with boron trifluoride etherate in mixture with ether-benzene, thus yielding 16β-methyl-6β-fluoro-pregnane-3β, 5α,11α-triol-20-one (intermediate V in which X is fluorine), or its 3,11-diester which can be easily sapsonified by known methods.

For the introduction of the hydroxyl group at C-17 the method of Kritchevsky and Gallagher (J. Am. Chem. Soc., 74, 483 (1952)) is followed by slow distillation of the steroid with acetic anhydride in the presence of p-toluenesulfonic acid the tetraacetates of the $\Delta^{17(20)}$-3β, 5α,11α,20-tetrols (VA) are produced as shown in the reaction diagram below.

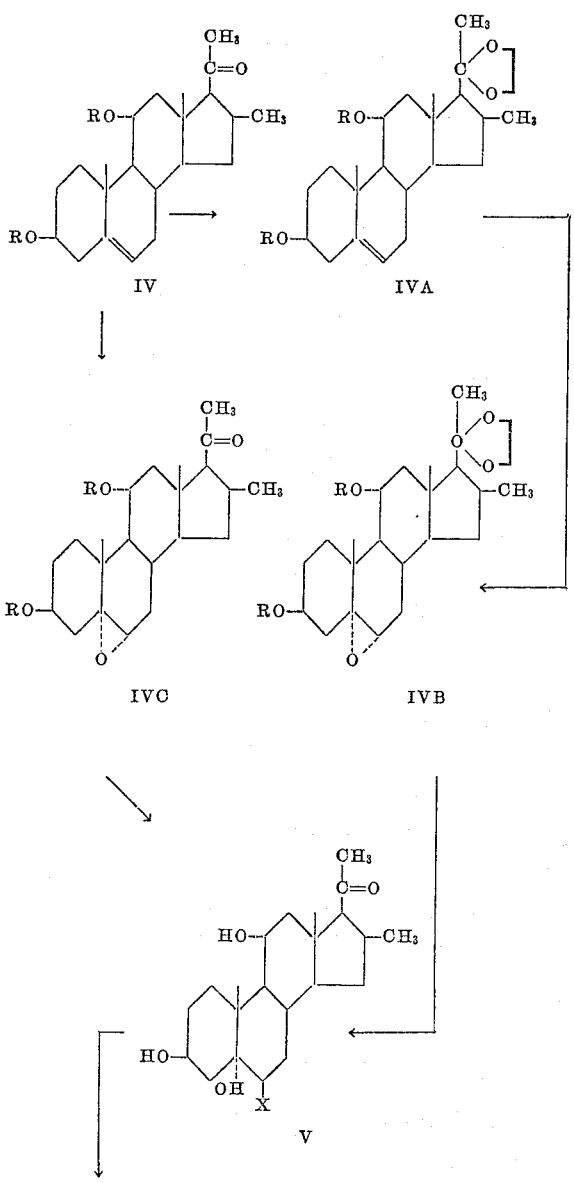

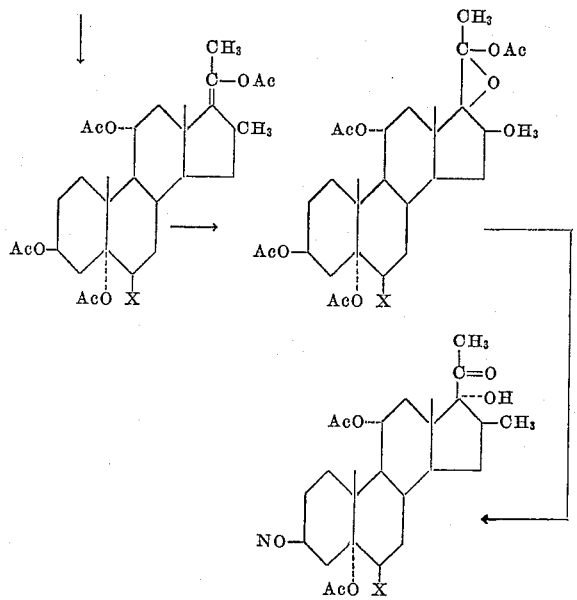

The double bond at C-17–20 is then oxidized to a 17,20-epoxide (VB) by reaction with a peracid, the epoxide is subjected to a mild alkaline treatment, for example with dilute methanolic potassium hydroxide at room temperature, which treatment causes the hydrolysis of the acetoxy groups at C-3 and C-20 and the opening of the epoxide ring with formation of the 5,11-diacetates of 6β,16β-dimethyl-pregnane-3β,5α,11α,17α-tetrol-20-one (intermediate VI, X being methyl), or of 16β-methyl - 6β - fluoro pregnane- 3β,5α,11α,17α-tetrol-20-one (intermediate VI, X being fluorine).

For the formation of the Δ⁴-3-keto grouping and the acetoxylation at C-21 any of the following methods can be employed:

Treatment of either of the aforementioned intermediates VI with chromic acid, preferably with 8 N-chromic acid in acetone solution oxidizes the 3-hydroxy group in these compounds to a keto group (intermediate VII).

The acetic acid groups between C-4 and C-5 are then eliminated and moreover, the steric configuration of X at C-6 is inverted by acid treatment, preferably by introducing a slow stream of dry hydrogen chloride into the solution of the compound in acetic acid, and intermediate VIII is obtained.

Alkaline treatment, for example with methanolic potassium hydroxide solution, then saponifies the acetate group at C-11. By reaction with iodine and calcium oxide in mixture with tetrahydrofurane-methanol as described by Stork, Ringold, Sondheimer and Rosenkranz, in Patent 2,874,154, followed by refluxing with potassium acetate in mixture with acetone, then leads to the formation of either 6α,16β-dimethyl-11-epi-hydrocortisone 21-acetate (Product IX; X=Me; R=H; R'=Ac) or 16β-methyl-6α-fluoro-11-epi-hydrocortisone 21-acetate (Product IX; X=F; R=H; R'=Ac).

Alternatively as shown in the next following reaction diagram, the 5,11-diacetate of 6β,16β-dimethyl-pregnane-3β,5α,11α,17α-tetrol-20-one or of 16β-methyl-6β-fluoro-pregnane-3β,5α,11α-17α-tetrol-20-one (intermediate VI) can be brominated at C-21 (VIA) by treatment with one molar equivalent of bromine in a solvent inert to this reaction, such as a mixture of carbon tetrachloride and chloroform, the bromine atom is then replaced by iodine (VIB), and, in turn substitution of the 21-acetoxy group (VIIA) for iodine is effected. The 3-hydroxy group is then oxidized to a keto group (VIIIA) and, by the aforementioned treatment with dry hydrogen chloride in glacial acetic acid solution, there is obtained the 11,21-diacetate of 6α,16β-dimethyl-11-epi-hydrocortisone (product IX;

X=Me; R=R'=Ac) or of 16β-methyl-6α-fluoro-11-epi-hydrocortisone (Product IX; X=F; R=R'=Ac), whose acetoxy groups can then be saponified by alkaline treatment.

The steps of this alternative mode of operation can be formulated as:

product was dissolved in methylene dichloride. This solution was washed with water, saturated aqueous sodium bicarbonate solution and saturated aqueous sodium chloride solution and the solvent was removed. The residue was dissolved in 10 cc. of 80% acetic acid, cooled to 8° C. and treated with a solution of 420 mg. of chromic acid in

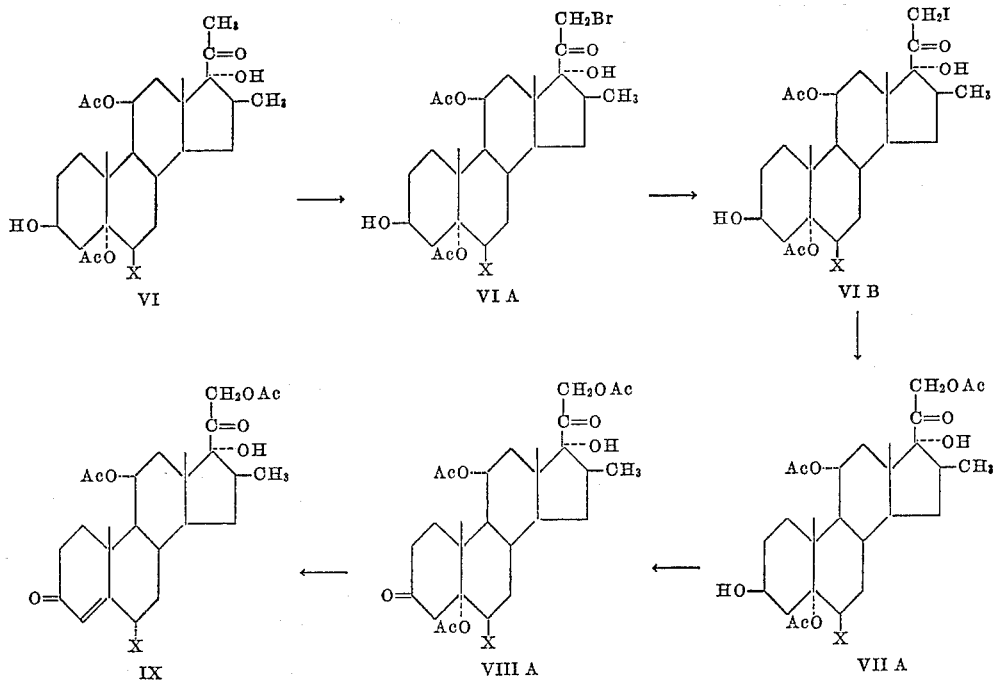

It is obvious that the aforementioned reactions can be considerably modified, both with respect to the reagents and solvents employed and the conditions under which the reactions are carried out. Thus, the starting compound can be any diester of 16β-methyl-Δ⁵-pregnene-3β,11α-diol-20-one formed with radicals of carboxylic acids of up to 12 carbon atoms, instead of the free compound or of the diacetate mentioned in the examples, since the ester groups are hydrolyzed in any case before the introduction of the 17α-hydroxy group is attempted; the substitution of of the bromine atom at C-21 by iodine and the subsequent acetolysis can be conducted in two separate stages rather than in a single step as described in the examples.

If the tetraacetates of 6β,16β-dimethyl-17α,20-oxido-pregnane-3β,5α,11α,20-tetrol or of 16β-methyl-6β-fluoro-17α,20-oxido-pregnane-3β,5α,11α,20-tetrol are subjected to an alkaline treatment at higher temperature the acetoxy group at C-11 is simultaneously hydrolyzed and the 5-acetates of the 3β,5α,11α,17α-tetrol-20-ones are obtained; the hydroxyl groups at C-3 and C-11 of the latter compounds are oxidized to keto groups and then the steric configuration at C-6 is inverted by means of the aforementioned treatment with dry hydrogen chloride; upon subsequent acetoxylation at C-21 there are obtained the 21-acetates of 6α, 16β-dimethyl-cortisone and 16β-methyl-6α-fluoro-cortisone.

The invention will be further illustrated by a number of examples which should, however, not be considered as limitation of the scope of the invention:

*Example No. I*

A mixture of 1 g. of 11α-hydroxy-diosgenin diacetate and 4 cc. of acetic anhydride was heated for 5 hours at 195° C. in a sealed tube. The resulting solution was poured with strong stirring into 100 cc. of water and allower to react for 1 hour in order to decompose the excess of anhydride. The water was decanted and the gummy 5.45 cc. of 90% acetic acid, previously cooled to 8° C. The solution was allowed to react for 10 minutes at room temperature and then poured into water. The product was isolated by extracting with methylene dichloride, washing the extract successively with water, saturated aqueous sodium bicarbonate solution and water. The extract was dried over anhydrous sodium sulfate and evaporated to dryness. The residue was dissolved in 6 cc. of acetone, treated with 5 cc. of water containing 500 mg. of potassium hydroxide and refluxed for 5 hours. The biphasic resulting solution was poured into water and the product was extracted with methylene dichloride, washed with water, dried over anhydrous sodium sulfate and evaporated to dryness. There was thus obtained a mixture of Δ⁵,¹⁶-pregnadiene-3β,11α-diol-20-one and its acetate at C-3 and/or at C-11.

The crude mixture was treated with an excess of acetic anhydride in pyridine solution at room temperature for 12 hours and then poured into water. The precipitate was collected, washed with water and chromatographed on neutral alumina, thus producing Δ⁵,¹⁶-pregnadien-3β,11α-diol-20-one diacetate.

A mixture of 10 g. of the latter compound, 400 cc. of anhydrous benzene free of thiophene and 5 cc. of a 3 N solution of methyl magnesium bromide in ether was refluxed for 6 hours, cooled, poured into 1 lt. of an ice cold solution of 40 g. of ammonium chloride, the organic was separated and the aqueous phase was extracted with ethyl acetate. The combined ethyl acetate and benzene solution was washed with aqueous saturated sodium chloride solution, dried over anhydrous sodium sulfate and evaporated to dryness. The residue was purified by chromatography on neutral alumina, this yielding 16α-methyl-Δ⁵-pregnene-3β,11α-diol-20-one.

In another experiment the benzene was substituted by tetrahydrofurance, with the same result.

A mixture of 8 g. of 16α-methyl-Δ⁵-pregnene-3β,11α-diol-20-one, 30 cc. of pyridine and 8 cc. of acetic anhydride was kept overnight at room temperature, poured into water, heated on the steam bath for half an hour and cooled; the precipitate was collected, washed with water, dried and recrystallized from acetone-hexane. There was thus obtained 16α-methyl-Δ$^5$-pregnene-3β,11α-diol-20-one diacetate.

A few drops of a saturated solution of dry hydrogen bromide in acetic acid were added to a solution of 10 g. of 6α-methyl-Δ$^5$-pregnene-3β,11α-diol-20-one diacetate in 120 cc. of glacial acetic acid, and the mixture was then slowly treated with a solution of 7.4 g. of bromine in 60 cc. of acetic acid under stirring and while maintaining the temperature at about 15° C. The mixture was kept standing for half an our, poured into water, and the formed precipitate was collected by filtration, washed with water and dried in vacuo. There was thus obtained 16α-methyl-5α,6β,17-tribromo-pregnane - 3β,11α - diol - 20-one diacetate in crude form, sufficiently pure for the next step. A sample was crystallized from acetone.

The above crude compound was dissolved in 1200 cc. of acetone, treated with 60 g. of sodium iodide, refluxed for 15 hours and then concentrated to a small volume under reduced pressure and poured into water. The product was extracted with ether and the ether solution was washed with 10% sodium sulfite solution and water, dried over anhydrous sodium sulfate and evaporated to dryness under reduced pressure, in a bath kept below 35° C. The residue, consisting of 16α-methyl-17-bromo-Δ$^5$-pregnene-3β,11α-diol-20-one diacetate was refluxed for one hour with 80 cc. of collidine, filtered from the collidine hydrobromide which precipitated, and the filter washed with ether; the filtrate was diluted with more ether and the solution was washed with dilute hydrochloric acid and water, dried over anhydrous sodium sulfate and evaporated to dryness. Crystallization of the residue from acetone yielded 16-methyl-Δ$^{5,16}$-pregnadiene-3β,11α-diol-20-one diacetate.

The above crude compound was dissolved in 700 cc. of ethyl acetate, mixed with approximately 5 g. of Raney nickel (Mozingo; Organic Syntheses, 21, 15 (1954)) and hydrogenated for 2½ hours, during which time there was absorbed approximately the equivalent of 1 mole of hydrogen; the catalyst was removed by filtration, the solution was evaporated to dryness and the residue crystallized from methanol, thus yielding 16β-methyl-Δ$^5$-pregnene-3β,11α-diol-20-one diacetate.

A mixture of 9 g. of the above compound and 450 cc. of 1% methanolic potassium hydroxide solution was kept under an atmosphere of nitrogen, at a temperature around 40° C. for one hour under continuous stirring. The solution was neutralized with acetic acid, concentrated to a small volume under reduced pressure and poured into ice water. The formed precipitate was collected, washed with water, dried and recrystallized from acetone-hexane. There was thus obtained the free 16β-methyl-Δ$^5$-pregnene-3β-11α-diol-20-one.

*Example No. II*

A mixture of 10 g. of 16β-methyl-Δ$^5$-pregnene-3β,11α-diol-20-one, 400 cc. of benzene, 80 cc. of ethyleneglycol distilled over potassium hydroxide and 1.0 g. of p-toluenesulfonic acid is refluxed for 18 hours, while using an adapter for the continuous removal of the water formed during the reaction. The reaction mixture is then neutralized with saturated aqueous sodium bicarbonate solution, washed with water to neutral, dried over anhydrous sodium sulfate and evaporated to dryness under reduced pressure. There is thus obtained 16β-methyl-20-ethylenedioxy-Δ$^5$-pregnene-3β,11α-diol.

The above ketal is dissolved in 200 c. of chloroform and mixed with 1.5 molar equivalents of monoperphthalic acid in ether solution. After 20 hours at room temperature, the mixture is diluted with water and the organic phase is washed first with water, then with a 5% aqueous sodium bicarbonate solution and again with water to neutral, dried over anhydrous sodium sulfate, filtered and evaporated to dryness under reduced pressure. The residue is chromatographed on neutral alumina, thus yielding 16β-methyl-20-ethylenedioxy-5α,6α-oxido - pregnane - 3β, 11α-diol.

A mixture of 5 g. of the above compound, 100 cc. of anhydrous benzene free of thiophene and 25 cc. of a 3 N solution of methyl magnesium bromide in ether is refluxed for 6 hours, cooled and poured into 1 liter of an ice-cold aqueous 5% ammonium chloride solution. The organic layer is separated, washed with saturated aqueous sodium chloride solution, dried over anhydrous sodium sulfate and evaporated to dryness. Chromatography of the residue on neutral alumina yields 6β,16β-dimethyl-20-ethylene-dioxy-pregnane-3β,5α,11α-triol.

A mixture of 3 g. of the above compound, 150 cc. of acetone, 3 cc. of water and 300 mg. of p-toluenesulfonic acid is maintained at room temperature for 6 hours and then diluted with water. A precipitate forms which is separated by filtration, washed with water and dried under vacuum, thus producing 6β,16β-dimethyl-pregnane-3β,5α, 11α-triol-20-one.

A mixture of 3 g. of the above compound, 1.35 g. of p-toluene-sulfonic acid and 150 cc. of acetic anhydride is then subjected to slow distillation at such a rate that about 120 cc. of distillate are collected in 5 hours. The distillation residue is poured into ice water and the resulting product is extracted with ether, washed to neutral, dried over anhydrous sodium sulfate and evaporated to dryness. The residue consists of 6β,16β-dimethyl-Δ$^{17(20)}$-pregnene-3β,5α,11α,20-tetrol tetraacetate, which is used for the next stage without further purification.

The above crude tetraacetate is treated with 120 cc. of a benzene solution of perbenzoic acid containing 1.2 molar equivalents of the reagent and kept at room temperature in the dark for 20 hours. It is then diluted with water; the benzene layer is separated, washed to neutral, dried over anhydrous sodium sulfate and evaporated to dryness. The residue consists of the crude 6β,16β-dimethyl-17α,20-oxido-pregnane-3β,5α,11,20-tetrol tetraacetate.

The above oxido compound is treated with 400 cc. of a 0.25 N solution of sodium hydroxide in methanol and kept at room temperature for 40 minutes, neutralized with acetic acid and concentrated to a small volume. The concentrate is diluted with ice water, so that a precipitate forms which is separated from the mother liquor. Chromatography yields 6β,16β-dimethyl-pregnane-3β,5α,11α,17α-tetrol-20-one 5,11-diacetate.

An 8 N solution of chromic acid in dilute sulfuric acid is rapidly added at 0° C. and under an atmosphere of nitrogen to a solution of 2.5 g. of the above compound in 90 cc. of acetone until the red-brown color of the oxidizing agent persists in the mixture; the mixture is stirred further for 5 minutes, diluted with ice water and the precipitate formed is separated, washed with water to neutral, dried and recrystallized from acetone-hexane. There is thus obtained an intermediate which is 6β,16β-dimethyl-pregnane-5α,11α,17α-triol-3,20-dione 5,11-diacetate.

A slow stream of dry hydrogen chloride is then introduced for 4 hours into a solution of 2 g. of the above compound in 200 cc. of glacial acetic acid, maintaining the temperature below 18° C. The mixture is poured into ice water and the precipitate filtered, washed with water, dried and recrystallized from acetone-hexane. There is thus obtained 6α,16β-dimethyl - Δ$^4$ - pregnene-11α,17α-diol-3,20-dione 11-acetate.

A mixture of 1.8 g. of the above compound and 90 cc. of a 1% methanolic potassium hydroxide solution is refluxed for 1 hour, neutralized with acetic acid, concentrated to a small volume and diluted with water; the precipitate formed is filtered, washed with water, dried and recrystallized from acetone-hexane. The free 6α,16β- dimethyl-Δ⁴-pregnene-11α,17α-diol-3,20-dione is thus obtained.

To a cooled solution of 1.5 g. of the above compound in 12 cc. of tetrahydrofurane and 7 cc. of methanol there is added 2.4 g. of calcium oxide and then 2.5 g. of iodine, while stirring at 25–30° C. until the color of the mixture turns pale yellow. The reaction mixture is then poured into 100 cc. of ice water containing 7 cc. of acetic acid and 0.8 g. of sodium thiosulfate, stirred for 15 minutes and most of the liquid is then separated by decantation. The precipitate is filtered, washed with water and dried under vacuum. The crude 6α,16β-dimethyl-21-iodo-Δ⁴-pregnene-11α,17α-diol-3,20-dione is thus obtained.

A mixture of the above compound with 50 cc. of acetone and 6 g. of recently fused potassium acetate is refluxed for 8 hours, concentrated to a small volume under reduced pressure and diluted with water. The acetolysis product is extracted with ether and the ether solution is washed, dried and evaporated to dryness. Crystallization of the residue from acetone-hexane yields 6α,16β-dimethyl-11-epi-hydrocortisone 21-acetate.

*Example No. III*

10 g. of 16β-methyl-Δ⁵-pregnene-3β,11α-diol-20-one diacetate are subjected to the method described in Example No. II, and there is obtained first 16β-methyl-20-ethylenedioxy-Δ⁵-pregnene-3β,11α-diol diacetate, then 16β-methyl-20-ethylenedioxy-5α,6α-oxido-pregnane-3β,11α-diol diacetate and finally 6β,16β-dimethyl-20-ethylenedioxy-pregnane-3β,11α,5α-triol, identical with the intermediate obtained in Example No. II.

*Example No. IV*

3 g. of the 5,11 diacetate of 6β,16β-dimethyl-pregnane-3β,5α,11α,17α-tetrol-20-one, an intermediate obtained as described in Example No. II, are dissolved in 100 cc. of a mixture of equal parts of chloroform and carbon tetrachloride; the solution is cooled to 10° C. and slowly mixed with 50 cc. of chloroform containing 1.05 molar equivalents of bromine under stirring, while waiting before each addition until the mixture has become decolorized. The mixture is then stirred on half an hour at 10° C., diluted with 5% aqueous sodium bicarbonate solution and the resulting organic layer is separated, washed with water, dried over anhydrous sodium sulfate and evaporated to dryness under reduced pressure in a bath below 40° C. The residue consists of 6β,16β-dimethyl-21-bromopregnane-3β,5α,11α,17α-tetrol-20-one 5,11-diacetate.

A mixture of the above compound, 4 g. of recently fused potassium acetate, 1.8 g. of sodium iodide, 1.5 cc. of glacial acetic acid in 120 cc. of anhydrous acetone is refluxed for 18 hours and then poured into water. The reaction product is extracted with chloroform, washed with water, dried over anhydrous sodium sulfate and evaporated to dryness. The residue is crystallized from acetone to produce 6β,16β-dimethyl-pregnane-3β,5α,11α,17α,21-pentol-20-one 5,11,21-triacetate.

By reaction with 8 N-chromic acid in acetone solution, in accordance with the method decribed in Example No. II, the compound is converted into 6β,16β-dimethyl-pregnane-5α,11α,17α,21-tetrol-3,20-dione 5,11,21-triacetate.

The latter compound is treated with dry hydrogen chloride in glacial acetic acid solution, in the same manner as described in Example No. II, to furnish 6α,16β-dimethyl-11-epi-hydrocortisone 11,21-diacetate which is converted into the free compound by treatment with 100 cc. of a 1% methanolic potassium hydroxide solution at 20° C. for 8 hours under an atmosphere of nitrogen.

*Example No. V*

To a solution of 5 g. of 16β-methyl-Δ⁵-pregnene-3β,11α-diol-20-one diacetate in 150 cc. of chloroform there is added an ether solution of monoperphthalic acid containing 1.2 g. of the reagent, and the mixture is then treated in the manner described in Example No. II to effect the epoxidation of 16β-methyl-20-ethylenedioxy-Δ⁵-pregnene-3β,11α-diol. There is thus obtained 16β-methyl-5α,6α-oxido-pregnane-3β,11α-diol-20-one diacetate.

A solution of 3 g. of the above compound in 300 cc. of a mixture of equal parts of ether and benzene is mixed with 3 cc. of boron trifluoride etherate and kept standing at room temperature for 3 hours. The solution is washed with water, dried over anhydrous sodium sulfate and evaporated to dryness. The residue is chromatographed on neutral alumina, thus furnishing 16β-methyl-6β-fluoro-3β,5α,11α-triol-20-one 3,11-diacetate.

This diacetate is hydrolyzed in accordance with the method described in Example No. II to produce the free 16β-methyl - 6β - fluoro-pregnane-3β,11α,5α-triol-20-one; the 17α-hydroxyl group is then introduced into the latter and the resulting 16β-methyl-6β-fluoro-pregnane-3β,5α,11α,17α-tetrol-20-one 5,11-diacetate is oxidized to 16β-methyl-6β-fluoro-pregnane - 5α,11α,17α - triol-3,20-dione 5,11-diacetate; treatment of the latter with dry hydrogen chloride leads to the formation of 16β-methyl-6α-fluoro-Δ⁴-pregnene-11α,17α-diol-3,20-dione 11-acetate, which is then saponified and acetoxylated at C–21, thus yielding finally 16β-methyl - 6α - fluoro-11-epi-hydrocortisone 21-acetate.

*Example No. VI*

In accordance with the method of Example No. IV, 16β - methyl-6β-fluoro-pregnane-3β,5α,11α,17α-tetrol-20-one 5,11-diacetate is brominated at C–21; the resulting 16β - methyl-6β-fluoro-21-bromopregnane-3β,5α,11α,17α-tetrol-20-one 5,11-diacetate is treated with sodium iodide and potassium acetate in acetic acid to produce 16β-methyl - 6β - fluoro-pregnane-3β,5α,11α,17α,21-pentol-20-one 5,11,21-triacetate; the latter is oxidized to 16β-methyl-6β-fluoro-pregnane - 5α,11α,17α,21 - tetrol-3,20-dione 5,11,21-triacetate which is treated with dry hydrogen chloride and then subjected to an alkaline hydrolysis, in accordance with the method described in Example No. IV, to yield 16β-methyl-6α-fluoro-11-epi-hydrocortisone.

What is claimed is:

1. In a method for preparing a 6α-substituted derivative of 16β-methyl-11-epihydrocortisone wherein the α-substituent at C–6 is methyl comprising, in combination, the steps of:

(a) forming the 20-alkyleneketal from a 16β-methyl-Δ⁵-pregnene-3β,11α-diol-20-one;

(b) treating the latter compound with a peracid to epoxidize the double bond therein;

(c) treating the resulting 16β-methyl-20-alkylenedioxy-5α,6α-oxido-pregnane-3β,11α-diol with a methyl magnesium halide, (d) acidically hydrolyzing the ketal group of the resulting 6β-methyl-ketal compound, so as to yield an intermediate having a methyl group in C–6β position a hydroxyl in C–5α position and the reformed keto at C–20.

(e) dissolving the resulting product in acetic anhydride and subjecting the resulting solution to slow distillation in the presence of catalytic amounts of an acid so as to produce 6β,16β-dimethyl-Δ¹⁷⁽²⁰⁾-pregnene-3β,5α,11α,20-tetrol tetraacetate;

(f) reacting the latter intermediate with a peracid so as to epoxidize the double bond of the intermediate;

(g) treating the resulting epoxide under mild alkaline conditions at room temperature so as to introduce an α-hydroxyl at C–17 in the intermediate;

(h) oxidizing the hydroxyl group at C–3 to a keto-group, and (i) treating the resulting 3-ketone with dry hydrogen chloride in glacial acetic acid solution, so as to form a Δ⁴-3-keto grouping in the 17α-hydroxylated intermediate, (j) iodinating the resulting Δ⁴-3-ketone, (k) acetoxylating the resulting 6α,16β-dimethyl-21-iodo-Δ⁴-pregnene-11α,17α-diol-3,20-dione to 6α,16β-dimethyl-11-epi-hydrocortisone 21-acetate.

2. In a method for preparing a 6α-substituted derivative of 16β-methyl-11-epihydrocortisone wherein the α-substituent at C–6 is a fluorine atom, comprising, in combination, the step of:
  (a) reacting 16β-methyl-Δ⁵-pregnene-3β,11α-diol-20-one with a peracid to epoxidize the double bond therein,
  (b) reacting the resulting epoxide with boron trifluoride in mixture with benzene-ether so as to obtain 16β-methyl-6β-fluoro-pregnane-3β,5α,11α-triol-20-one.
  (c) dissolving the resulting product in acetic anhydride and subjecting the resulting solution to slow distillation in the presence of catalytic amounts of an acid so as to produce 16β-methyl-6β-fluoro-Δ¹⁷⁽²⁰⁾-pregnene-3β,5α,11α,20-tetrol tetraacetate;
  (d) reacting the latter intermediate with a peracid so as to epoxidize the double bond of the intermediate;
  (e) treating the resulting epoxide under mild alkaline conditions at room temperature so as to introduce an α-hydroxyl at C–17 in the intermediate;
  (f) oxidizing the hydroxyl group followed by treatment with anhydrous hydrogen chloride at C–3 to a keto group,
  (g) iodinating the resulting Δ⁴-3-ketone,
  (h) acetoxylating the resulting 16β-methyl-6α-fluoro-21-iodo-Δ⁴-pregnene-11α,17α-diol-3,20-dione to 16β-methyl-6α-fluoro-11-epi-hydrocortisone 21-acetate.

3. A new compound selected from the group of 16β-methyl-5α,6α-oxido-pregnane-3,β,11α-diol-20-one and the hydrocarbon carboxylic acid esters of less than 12 carbon atoms thereof.

4. A new compound selected from the group consisting of 6β,16β-dimethyl-pregnane-3β,5α,11α-triol-20-one and the 3,11-hydrocarbon carboxylic acid diesters of less than 12 carbon atoms thereof.

5. A new compound selected from the group consisting of 16β-methyl-6β-fluoro-pregnane-3β,5α,11α-triol-20-one and the 3,11-hydrocarbon carboxylic acid diesters of less than 12 carbon atoms thereof.

6. 6β,16β-dimethyl-Δ¹⁷⁽²⁰⁾-pregnene-3β,5α,11α,20-tetrol tetraacetate.

7. 16β-methyl-6β-fluoro-Δ¹⁷⁽²⁰⁾-pregnene-3β,5α,11α,20-tetrol tetraacetate.

8. 6β,16β-dimethyl-pregnane-3β,5α,11α,17α-tetrol-20-one 5,11-diacetate.

9. 16β-methyl-6β-fluoro-pregnane-3β,5α,11α,17α-tetrol-20-one 5,11-diacetate.

10. 6β,16β-dimethyl-pregnane-5α,11α,17α-triol-3,20-dione 5,11-diacetate.

11. 16β-methyl-6β-fluoro-pregnane-5α,11α,17α-triol-3,20-dione 5,11-diacetate.

12. 6β,16β-dimethyl-pregnane-3β,5α,11α,17α,21-pentol-20-one, 5,11,21-triacetate.

13. 16β-methyl-6β-fluoro-pregnane-3β,5α,11α,17α,21-pentol-20-one 5,11,21-triacetate.

14. 6β,16β-dimethyl-pregnane-5α,11α,17α,21-tetrol-3,20-dione 5,11,21-triacetate.

15. 16β-methyl-6β-fluoro-pregnane-5α,11α,17α,21-tetrol-3,20-dione 5,11,21-triacetate.

16. 6α,16β-dimethyl-Δ⁴-pregnene-11α,17α-diol-3,20-dione 11-acetate.

17. 16β-methyl-6α-fluoro-Δ⁴-pregnene-11α,17α-diol-3,20-dione 11-acetate.

18. 6α,16β-dimethyl-Δ⁴-pregnene-11α,17α-diol-3,20-dione.

19. 16β-methyl-6α-fluoro-Δ⁴-pregnene-11α,17α-diol-3,20-dione.

20. 6α,16β-dimethyl-21-iodo-Δ⁴-pregnene-11α,17α-diol-3,20-dione.

21. 16β-methyl-6α-fluoro-21-iodo-Δ⁴-pregnene-11α,17α-diol-3,20-dione.

22. 6α,16β-dimethyl-11-epi-hydrocortisone 11,21-diacetate.

23. 16β-methyl-6α-fluoro-11-epi-hydrocortisone 11,21-diacetate.

24. In a method for preparing 11α-epihydrocortisone derivatives comprising, in combination, the steps of
  (a) degrading a sapogenin having the general formula:

wherein R is selected from the group consisting of hydrogen and a hydrocarbon carboxylic acyl group of less than 12 carbon atoms, by treatment with acetic anhydride, heating, followed by oxidation with chromic acid to form a compound of the following formula:

wherein R has the same meaning as above;
  (b) reacting the latter product with a methyl magnesium halide in an organic solvent inert to the two reactants to obtain a 16α-methyl-pregnane-3β,11α-diol-20-one derivative having a general formula:

wherein R has the same meaning as above;
  (c) inverting the steric configuration of the methyl group at C–16 by the steps of bromination to form the 5,6,17-tribromo compound, debromination with an alkali metal halide, dehydrobromination at C–16, 17 and selective hydrogenation of the thus formed 16-methyl-Δ⁵,¹⁶ pregnadiene derivative;
  (d) forming the corresponding 20-alkyleneketal by reaction with an alkylene glycol;
  (e) treating the thus formed 20-alkylene ketal with a peracid to epoxidize in the double bond therein;
  (f) treating the resulting 16β-methyl-20-alkylenedioxy-5α,6α-oxido-pregnane-3β,11α-diol with a methyl magnesium halide;
  (g) acidically hydrolyzing the ketal group of the resulting 6β-methyl-ketal compound, so as to yield an intermediate having a methyl group in C–6β position a hydroxyl in C–5α position and the reformed keto at C–20
  (h) dissolving the resulting product in acetic anhydride and subjecting the resulting solution to slow distillation in the presence of catalytic amounts of an acid so as to produce 6β,16β-dimethyl-Δ$^{17(20)}$-pregnene-3β,5α,11α,20-tetrol tetraacetate;

(i) reacting the latter intermediate with a peracid so as to epoxidize the double bond of the intermediate;

(j) treating the resulting epoxide under mild alkaline conditions at room temperature so as to introduce an α-hydroxyl at C–17 in the intermediate;

(k) oxidizing the hydroxyl group at C–3 to a keto-group, and (l) treating the resulting 3-ketone with dry hydrogen chloride in glacial acetic acid solution, so as to form a Δ$^4$-3-keto grouping in the 17α-hydroxylated intermediate;

(m) iodinating the resulting Δ$^4$-3-ketone;

(n) acetoxylating the resulting 6α,16β-dimethyl-21-iodo-Δ$^4$-pregnene-11α,17α-diol-3,20-dione to 6α,16β-dimethyl-11-epi-hydrocortisone 21-acetate.

25. In a method for preparing 11α-epihydrocortisone derivatives comprising, in combination, the steps of (a) degrading a sapogenin having the general formula:

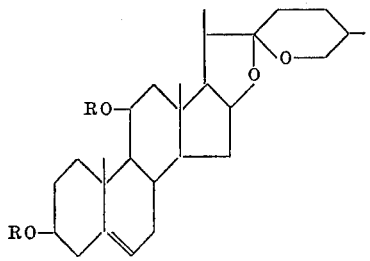

wherein R is selected from the group consisting of hydrogen and a hydrocarbon carboxylic acyl group of less than 12 carbon atoms, by treatment with acetic anhydride, heating, followed by oxidation with chromic acid to form a compound of the following formula:

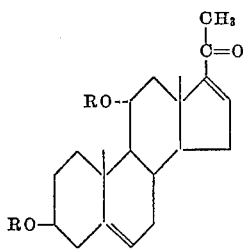

wherein R has the same meaning as above;

(b) reacting the latter product with a methyl magnesium halide in an organic solvent inert with the two reactants to obtain a 16α-methyl-pregnane-3β,11α-diol-20-one derivative having the general formula:

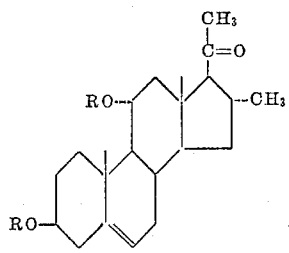

wherein R has the same meaning as above;

(c) inverting the steric configuration of the methyl group at C–16 by the steps of bromination to form the 5,6,17-tribromo compound, debromination with an alkali metal halide, dehydrobromination at C–16, 17 and selective hydrogenation of the thus formed 16-methyl-Δ$^{5,16}$ pregnadiene derivative;

(d) reacting the resulting 16β-methyl derivative with a peracid to epoxidize the double bond therein;

(e) reacting the thus formed 5α,6α-epoxide with boron trifluoride to obtain the corresponding 16β-methyl-6β-fluoro-pregnane-3β,5α,11α-triol-20-one;

(f) dissolving the resulting product in acetic anhydride and subjecting the resulting solution to slow distillation in the presence of catalytic amounts of an acid so as to produce 16β-methyl-6β-fluoro-Δ$^{17(20)}$-pregnene-3β,5α,11α,20-tetrol tetraacetate;

(g) reacting the latter intermediate with a peracid so as to epoxidize the double bond of the intermediate;

(h) treating the resulting epoxide under mild alkaline conditions at room temperature so as to introduce an α-hydroxyl at C–17 in the intermediate;

(i) oxidizing the hydroxyl group followed by treatment with anhydrous hydrogen chloride at C–3 to a keto group;

(j) iodinating the resulting Δ$^4$-3-ketone;

(k) acetoxylating the resulting 16β-methyl-6α-fluoro-21-iodo-Δ$^4$-pregnene-11α,17α-diol-3,20-dione to 16β-methyl-6α-fluoro-11-epi-hydrocortisone 21-acetate.

References Cited in the file of this patent

UNITED STATES PATENTS

| | | |
|---|---|---|
| 2,773,079 | Djerassi et al. | Dec. 4, 1956 |
| 2,776,969 | Rosenkranz et al. | Jan. 8, 1957 |

OTHER REFERENCES

Rothman et al.: 81, J.A.C.S., 411–415 (1959).
Halpern et al.: 81, J.A.C.S., 439–441 (1959)